US009213898B2

(12) United States Patent  
Gurbuz (10) Patent No.: US 9,213,898 B2  
(45) Date of Patent: *Dec. 15, 2015

(54) OBJECT DETECTION AND EXTRACTION FROM IMAGE SEQUENCES

(71) Applicant: SONY CORPORATION, Tokyo (JP)

(72) Inventor: Sabri Gurbuz, Sunnyvale, CA (US)

(73) Assignee: SONY CORPORATION, Tokyo (JP)

(*) Notice: Subject to any disclaimer, the term of this patent is extended or adjusted under 35 U.S.C. 154(b) by 50 days.

This patent is subject to a terminal disclaimer.

(21) Appl. No.: 14/265,674

(22) Filed: Apr. 30, 2014

(65) Prior Publication Data

US 2015/0317519 A1 Nov. 5, 2015

(51) Int. Cl.
| | | |
|---|---|---|
| G06K 9/00 | (2006.01) | |
| G06T 1/60 | (2006.01) | |
| G06K 9/46 | (2006.01) | |
| G06K 9/48 | (2006.01) | |
| G06K 9/52 | (2006.01) | |

(52) U.S. Cl.
CPC ........ *G06K 9/00711* (2013.01); *G06K 9/00791* (2013.01); *G06K 9/4604* (2013.01); *G06K 9/468* (2013.01); *G06K 9/48* (2013.01); *G06K 9/52* (2013.01); *G06T 1/60* (2013.01)

(58) Field of Classification Search
CPC ........................................... G06T 1/60
See application file for complete search history.

(56) References Cited

U.S. PATENT DOCUMENTS

2004/0141554 A1* 7/2004 Phong et al. ............. 375/240.12  
2004/0223652 A1* 11/2004 Cetin et al. .................... 382/235  
2007/0285575 A1* 12/2007 Gloudemans et al. ........ 348/587  
2008/0273751 A1* 11/2008 Yuan et al. ..................... 382/103  
2009/0074246 A1* 3/2009 Distante et al. ............... 382/103  
2009/0231453 A1* 9/2009 Huang ......................... 348/220.1  
2009/0309966 A1 12/2009 Chen et al.  
2013/0083854 A1 4/2013 Pace  
2013/0169834 A1* 7/2013 Herz et al. ................. 348/220.1

OTHER PUBLICATIONS

RR Schultz and RL Stevenson, "Extraction of High-Resolution Frames from Video Sequences," IEEE Transactions on Image Processing, vol. 5, No. 6, Jun. 1996.*  
O Barnich and M Van Droogenbroeck, "ViBe: A Universal Background Subtraction Algorithm for Video Sequences," IEEE Transactions on Image Processing, vol. 20, No. 6, Jun. 2011.*  
Zang and Klette, "Object Classification and Tracking in Video Surveillance," Computer Analysis of Images and Patterns Lecture Notes in Computer Science vol. 2756, 2003, pp. 198-205.

* cited by examiner

*Primary Examiner* — Matthew Bella  
*Assistant Examiner* — Soo Shin  
(74) *Attorney, Agent, or Firm* — John P. O'Banion (57) ABSTRACT

Object detection and extraction is performed from image sequences utilizing circular buffers for both source images and tracking. The detection and extraction process is performed in relation to the previous and current image, and the current and next image, including: alignment, absolute difference, removal of non-overlaps, and contour detection in difference images. An intersection is performed on these two outputs to retain contours of the current image only. Recovery of missing contour information is performed utilizing gradient tracing, followed by morphological dilation. A splitting process is performed if additional objects are found in a bounding box area. A mask image bounded by object contour is created, color attributes assigned, object verification performed and outliers removed. Then untracked objects are removed from the mask and a mask is output for moving objects with rectangular boundary box information.

20 Claims, 4 Drawing Sheets

OBJECT DETECTION AND EXTRACTION FROM IMAGE SEQUENCES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Field of the Technology

This disclosure pertains generally to video processing, and more particularly to detecting and extracting moving objects from image sequences.

2. Background Discussion

Object detection and extraction from image sequences are important operations performed in applications, such as movie post production, and in the digital/mobile camera industry for creating new types of photos and motion videos from ordinary videos. However, a practical object detection and fine boundary object extraction system has not been available.

Accordingly, a need exists for a practical object detection and extraction system which can be implemented on mobile devices in real-time.

BRIEF SUMMARY OF THE TECHNOLOGY

The inventive method and apparatus automatically extracts dynamic multiple moving objects from a sequence of images captured with arbitrarily moving cameras. It will be noted that the camera doesn't need to be on a static platform, such as a tripod. Accordingly, the camera may be hand-held or on a moving platform, for instance as installed on a car. The system is capable of detecting and extracting a moving object which appears in at least three consecutive image frames in video (or images of the image sequence). This technology significantly advances the state-of-the-art detection and extraction of multiple objects in real-time.

More particularly, the present technology doesn't require prior training about objects, as it detects and extracts arbitrary moving objects by detecting the changes in aligned three consecutive frames in videos. That is, the absolute difference between the previous and the current image would cause difference in previous location of an object in previous frame as well as in the current location of the object in the current frame. Likewise, the absolute difference between the current frame and the next frame differ at the current location in the current frame and next location in the next frame. Hence, the intersection of these two difference images is outputs as a difference at the current object location, which facilitates rapid object detection and extraction.

Incoming image frames are downsized and then stored in a circular buffer structure having three image buffers. Original source images are similarly stored in a circular buffer having at least two image buffers, and up to any desired number (N), depending on the application requirement. For example, only the current image and next image information is necessary for motion video application for avoiding the image copy process for updating the background image.

The detection and extraction process is performed in relation to the previous I1 and current image I2, and the current image I2 and next image I3, including: alignment, absolute difference, removal of non-overlaps, and contour detection in difference images. Contour detection is preferably performed as an iterative process, utilizing lower sensitivity thresholds in subsequent iterations. Two difference outputs are generated, these being referred to herein for convenience as previous difference, and next difference. An intersection is performed between previous difference and next difference (the two difference outputs) to retain contours of the current image only. Recovery of missing contour information is performed utilizing gradient tracing, such as a Sobel gradient and gradient tracing. A morphological dilation is performed to close gaps around the contour. A splitting process is performed if additional disjoint objects are found in a bounding box area. A mask image bounded by object contour is created, color attributes assigned, object verification performed, such as a Mahalanobis distance metric, and then the outliers are removed. Untracked objects are then removed from the mask and the mask is output which describes moving objects with rectangular boundary box information.

Further aspects of the technology will be brought out in the following portions of the specification, wherein the detailed description is for the purpose of fully disclosing preferred embodiments of the disclosure without placing limitations thereon.

BRIEF DESCRIPTION OF THE SEVERAL VIEWS OF THE DRAWING(S)

The disclosure will be more fully understood by reference to the following drawings which are for illustrative purposes only.

DETAILED DESCRIPTION

Figure 1:
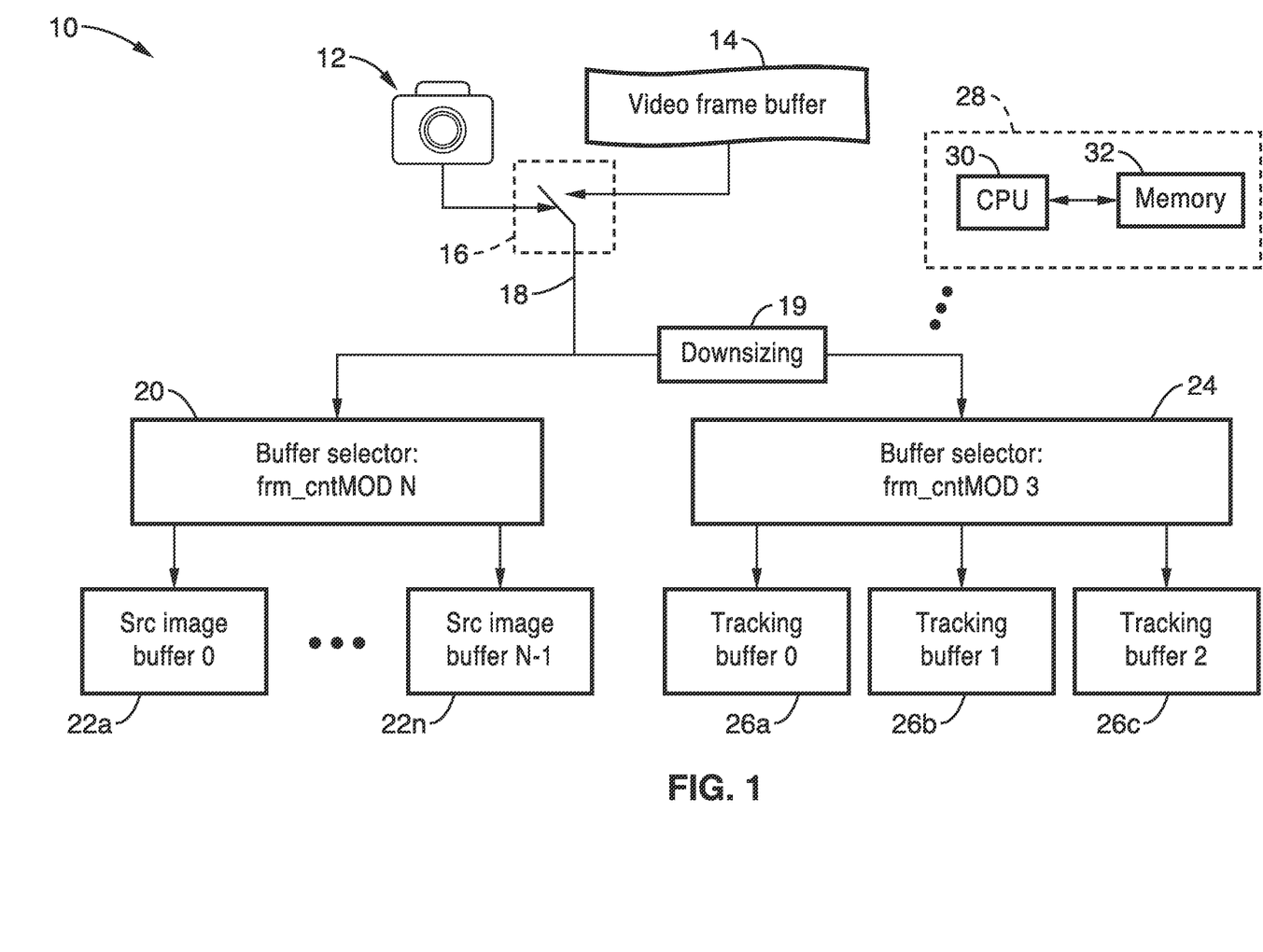
FIG. 1 is a block diagram of the use of circular source and tracking buffers according to an embodiment of the present disclosure.

FIG. 1 illustrates an example embodiment 10 for performing object detection and extraction from image sequences. As seen from the block diagram, the image sequence being processed may be received from either a camera 12, or from a video frame buffer 14, such as contained within a video processing system or other device for retaining video frames. Switch 16 in the figure merely represents that there are multiple options for video frame sequence 18 to be received for inventive processing.

Incoming image frames in frame sequence 18 are downsized 19 for use in tracking for computational cost reasons; by way of example a 1920 ×1080 HD input image can be downsized to 480×270 by sub-sampling. The downsized frame sequence is stored in a multiple frame circular buffer, such as preferably including three frames 26a, 26b, 26c, as selected by a buffer selector 24. The current and previous original sized source images (not downsized) are stored in a separate buffer, such as having two or more frames, for the motion video application. The figure depicts N buffers (0 through N−1) 22a through 22n selected by selector 20.

Consider the case where we have three pointers pointing to buffer 0, buffer 1 and buffer 2, and we want to extract moving objects at frame #67 in the video. Then we need frame #65 (I1), frame #66 (I2), and frame #67 (I3) in the buffers. Then, (67−2) MOD 3=1 and (67−1) MOD 3=0, (67−0) MOD 3=2. That is, prv_ptr for I1 will point to buffer 1, cur_ptr for I2 will point to buffer 0, and next_ptr for I3 will point to buffer 2. When the frame number advances to 68, the inventive apparatus only changes pointer addresses where they point to depending on MOD arithmetic: prv_ptr=Buffer[66 MOD 3], cur_ptr=buffer[67 MOD 3], next_ptr=buffer[68 MOD 3]. Accordingly, the apparatus does not require copying images from one buffer to another.

In the above case, the current image is actually the previous image (one frame delay) so the system is required to store two frames at least for the original image 22a and 22n.

It will be appreciated that embodiments of the present technology can include more than three buffers to increase the robustness of the system. The current object detection core of this embodiment is based on $|I1-I2|^\wedge|I2-I3|$ where I2 is the center image and, $|\cdot|$ is the absolute operation, and $^\wedge$ is the intersection operation. If we increase the buffer size to say five, then I3 will be the center image. Then one can utilize $|I1-I3|^\wedge|I3-I5|$ that results in moving object locations in image I3; or alternately $|I1-I3|^\wedge|I3-I5|+|I2-I3|^\wedge|I3-I4|$ can be utilized.

Downsizing is preferably performed by first re-sizing the image, such as to a VGA size, prior to storing in circular buffer 26a through 26c. The circular buffer is configured for storing three frames with buffer transitions 0→1→2→0→1 and so on. It will be appreciated that the modulo operator in the C language is represented by "%". Image frame n=0 will be placed to buffer[0%3=0], frame n=1 will be placed to buffer[1%3=1], frame n=2 will be placed in buffer[2%3=2], frame n=3 will be placed in buffer[3%3=0], and frame n=4 will be placed in buffer[4%3=1] and so on. Inside of the [·] are only 0, 1, and 2. That is, if we need to access the previous frame# n−1 later, then prv_ptr=buffer[(n−1)%3]. Likewise, original source image is also stored in a circular buffer capable of storing at least two frames. The previous image information is necessary for the motion video application development. In this operation $|I1-I2|^\wedge|I2-I3|$ image I2 is considered as the current image; indeed, it is actually the previous image. However, the apparatus uses I3 as the current image in the next frame processing. Therefore, the inventive apparatus stores the last two original frames.

Tracking image buffers 26a through 26c, are of a size that is less than or equal to the source image size. Tracking buffers are utilized for object extraction. The source image buffers 22a through 22n, comprise N buffers (0 to N−1) which are utilized for post-image formation (application), such as placing multiple poses of objects in a single frame (stroboscopic image formation) where objects are extracted from image sequences of video. In at least one embodiment of the present technology, N is defined as BUF_LENGTH in the code, which by way of example can be defined as BUF_LENGTH=2.

Control of buffer selection as well as the object detection and extraction process are preferably performed by at least one processing element 28, such as including at least one computer processor 30 (e.g., CPU, microprocessor, microcontroller, DSP, ASIC with processor, and so forth), operating in conjunction with at least one memory 32. It will be appreciated that programming is stored on memory 32, which can include various forms of solid state memory and computer-readable media, for execution by computer processor 30. The present technology is non-limiting with regard to types of memory and/or computer-readable media, insofar as these are non-transitory, and thus not constituting a transitory electronic signal.

Figure 2A:
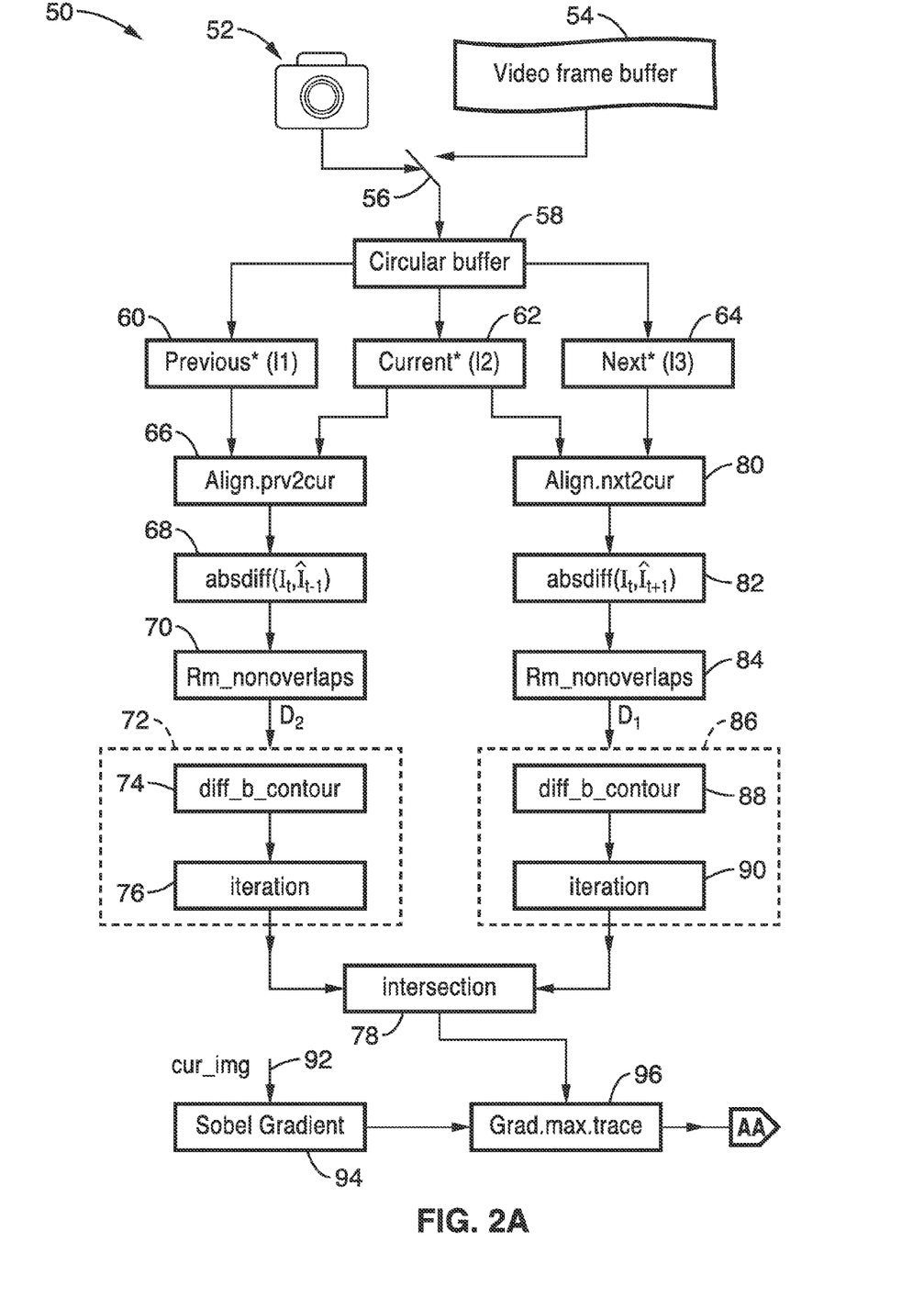
FIG. 2A and FIG. 2B are a flow diagram of real-time object detection and extraction according to an embodiment of the present disclosure.
Figure 2B:
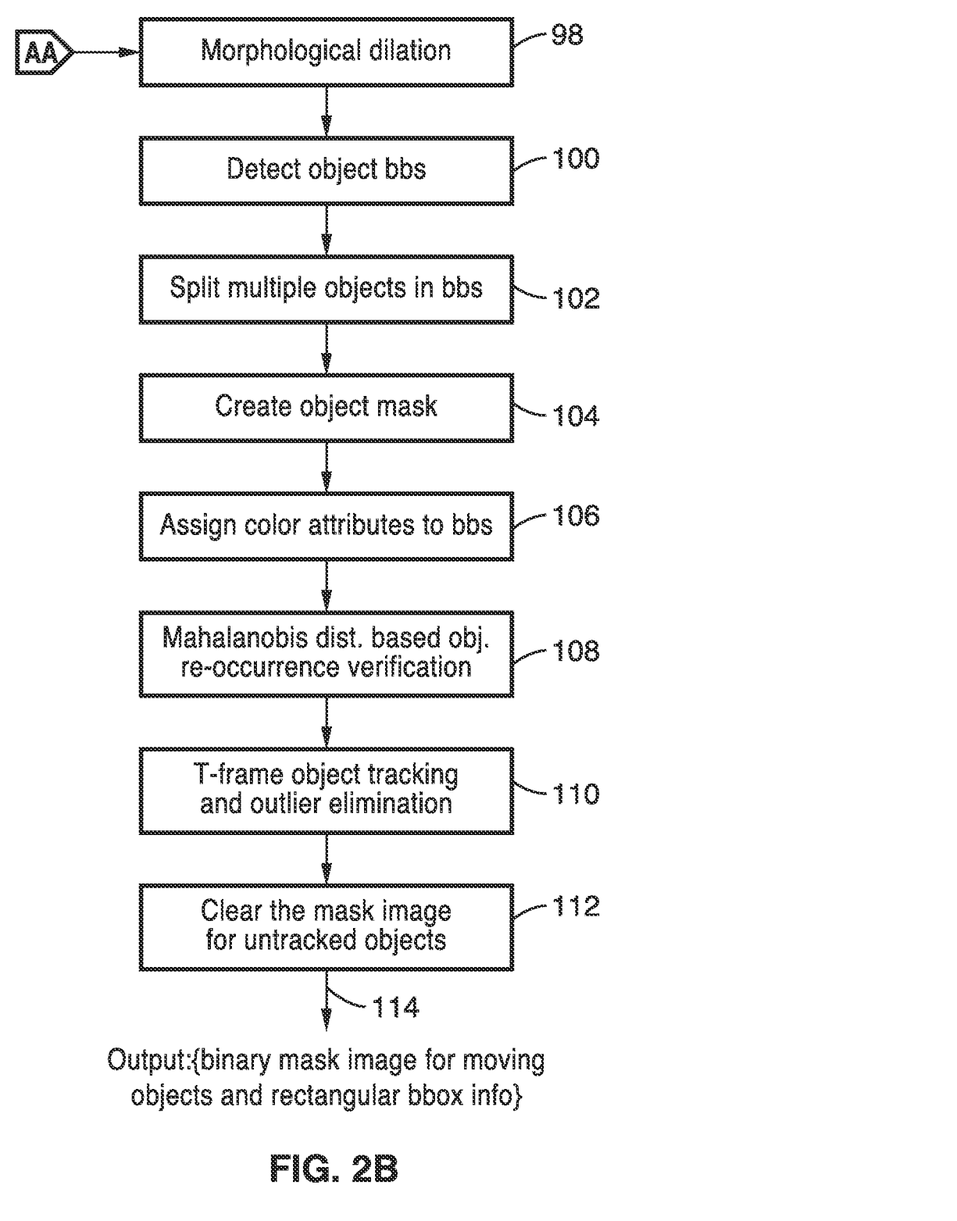

FIG. 2A through FIG. 2B illustrate an example embodiment 50 of the inventive object detection and extraction method. It will be appreciated that a computer processor and memory, such as seen in FIG. 1, are preferably utilized for carrying out the steps of the inventive method.

It is also seen in this figure, that the image sequence being processed may be selected 56 either from a camera 52 or from a video frame buffer 54, in which a video frame sequence is put into a circular buffer 58.

In order to detect and automatically extract multiple moving objects, images in the tracking buffer are seen in FIG. 1 with buffers 26a, 26b, 26c utilized for retaining three consecutive images: previous 60, current 62, and next 64, as I1, I2, I3. Separate processing paths, 66 through 76 and 80 through 90, are seen in the figure for processing inputs from both I1 and I2, or I2 and I3, respectively.

Alignment is performed 66, 80, on previous and next, respectively, with respect to static scenes in the image at every incoming frame instance utilizing a known image alignment process, preferably utilizing the global whole frame image alignment algorithm from Sony. The absolute difference is determined between the aligned I1 and I2 in 68, and likewise the aligned I3 and I2 in 82. After removing the non-corresponding (non-overlapping areas at frame borders after the alignment) redundant regions at frame borders in the difference images 70, 84, then contours 72, 86 of the objects are detected on each difference image. This can be understood by considering a video camera which is capturing video. The camera moves towards the right whereby a partially new scene is being captured that was not in the previous frame. Then, when the previous and current frames are aligned, there wouldn't be correspondence scene at the right frame border due to non-overlapping camera field of view. That is what is considered the "Non-corresponding" area after the alignment.

It will be seen that this process of determining the contours is iterative, shown exemplified with diff_b_contours 74, 88, and iteration control iteration 76, 90. An initial object contour being determined from a first pass, with contour detection utilizing a lower sensitivity threshold for further search of object contours using the initial object contour results from the previous modules, within additional iterations, typically pre-set to two iterations. Contour detection results in creating double object contours, as in both difference images, due to the movement in time of the object. Therefore, an intersection operation is performed 78 to retain the contours of objects in current image I2 only wherein object contours are located.

In some cases, part of the object contour information may be missing. Accordingly, to recover missing contour information, a gradient of image I2 (from cur_img) 92 is determined 94, such as by using a Sobel gradient, and the contour is recovered 96 utilizing gradient tracing 96, such as Grad.max-.trace. Preferably this step includes a maximum connecting gradient trace operation to recover any missing object contours.

The recovered contour is output to a block which performs morphological dilation 98, as seen in FIG. 2B. The resulting object contour data is dilated to close further gaps inside the contour. An object bounding box is determined 100, such as by using a function bbs for performing bounding box (bb) for each object. Initial bounding box information of the objects is detected, preferably by utilizing vertical and horizontal projection of the dilated contour image. However, in some cases, a larger object may contain a smaller object. Therefore, a region growing based splitting process 102 is utilized to split the multiple objects, if any, in each bounding box area to separate any non-contacting objects in each bounding box.

A mask image bounded by each object contour is created 104. In order to track objects temporally, color attributes of objects are extracted from the input image corresponding to object mask area and color assignments stored in the object data structure 106. Then, the objects in the current frame are verified, such as by preferably utilizing Mahalanobis distance metric 108 using object color attributes, with the objects in the previous T frames (where T=1 is the default value). Then, the objects that are not verified (not tracked) in the verification stage of the T consecutive frames are considered as outliers and removed from the current object mask image 110. In at least one embodiment of the disclosure, the value of T is 1, although values greater than 1 can be utilized. The attributes of the removed object are preferably still retained for verification of the objects in the next frame, in the object attribute data structure.

The mask is then cleared of the untracked objects (not verified) 112 to output a binary mask 114 of moving objects and rectangular boundary box information, as a Boolean image where detected object pixel locations are set to "true", and the remainder set to "false".

Figure 3:
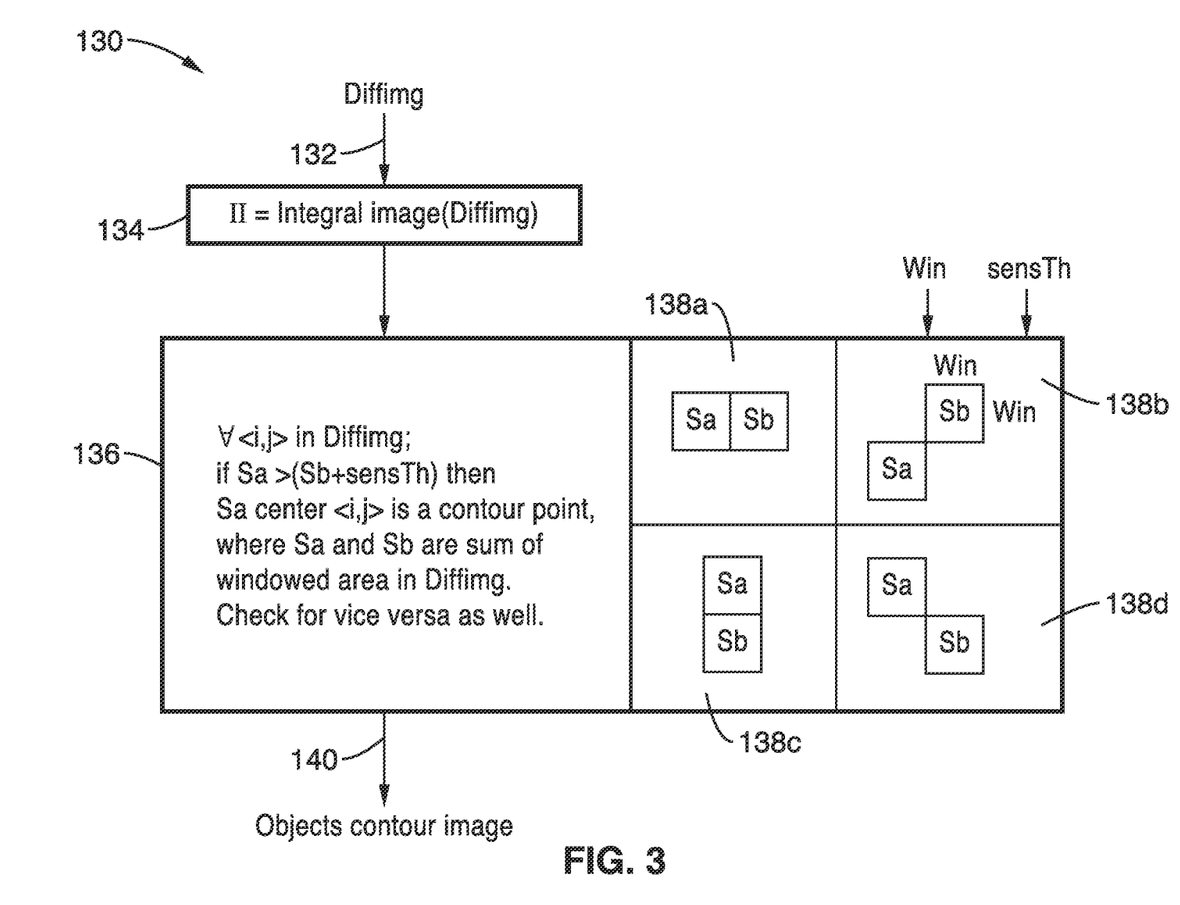
FIG. 3 is a flow diagram of the object contour detection process utilizing the difference image according to an embodiment of the present disclosure.

FIG. 3 illustrates the object contour detection process 130 diff_b_contour, seen in FIG. 2A, blocks 74 and 88, using the difference image. Parameter diffimg 132 is received at block 134 for I1=Integral image (Diffimg). The diff_b_contour (diffimg, Win, sensTh.) method accepts three parameters: diffimg which is D2 from 70 in FIG. 2A, the Win sub-window value (typically 7×7) and sensTh as sensitivity threshold value. Block 136 in FIG. 3 executes three separate filters to detect moving object borders on the difference image: 138a is a horizontal filter, 138b is a 45 degree filter, 138c is a 90 degree filter, and 138d is a 135 degree filter. Sa and Sb represent sum of the intensity values inside each sub-window, respectively. If Sa>(Sb+sensTh), then Sa sub-window area is considered to be on a moving object contour and set to be true in that case, where sensTh is typically assigned to a value of 16 per pixel (sensTh=Win×16) at the first iteration and 8 per pixel at the second iteration 76. It will be noted that iteration 76 operated on pixels adjacent to already extracted contour pixels in the first iteration. Furthermore, the inventive method checks for the condition Sb>(Sa+sensTh), if true then Sb sub-window area is set to be the moving object border. As a result, the objects contour image 140 is output as moving object borders from images 60 and 62 (of FIG. 2A) jointly in the output image. Blocks 64 through 90 in FIG. 2A output moving object borders from images 62 and 64 jointly. However, then the intersection operation 78 retains the moving object contours from the current image 62 only.

Referring to FIG. 3, a dynamic thresholding of the technology is discussed. In considering Sb>(Sa+sensTh) (sensTh is a sensitivity threshold), it will be appreciated that there is no hard-coded threshold, instead the threshold is preferably a relative threshold operation as seen. In the present embodiment, the dynamic threshold is achieved by comparing a first sum of intensity value (e.g., Sa or Sb) against a second sum of intensity values (e.g., Sb or Sa) added to a sensitivity threshold sensTh as an offset. For example consider Sb=240, Sa=210, SensTh=16 that is 240>210+16, then the Equation would be true. Similarly, considering Sb=30, Sa=10, SensTh=16, that is 30>10+16, then again the equation would be true. On the other hand, consider the case with Sb=240, Sa=230, and SensTh=16, that is 240>230+16, then the equation would be false.

Embodiments of the present technology may be described with reference to flowchart illustrations of methods and systems according to embodiments of the disclosure, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that this technology can be embodied in various ways, including the following:

1. An apparatus for performing object detection and extraction from image sequences, comprising: (a) a computer processor; and (b) programming in a non-transitory computer readable medium and executable on said computer processor for performing steps comprising: (i) downsizing images from an image sequence; (ii) buffering at least three sequential images of the image sequence in a circular buffer; (iii) aligning previous image and next image to a current image of said image sequence and outputting a previous difference between the previous image and the current image, and a next difference between the current image and the next image; (iv) determining absolute differences between aligned previous image and aligned current image, and between aligned current image and aligned next image; (v) removing non-overlaps which are redundant non-corresponding sections due to the non-overlap; (vi) detecting contours on each difference image; (vii) performing an intersection between previous difference and next difference to retain contours of the current image only; (viii) performing gradient tracing to recover any missing object contour information; (ix) generating an object mask and assigning color attributes to a bounding box; and (x) eliminating outliers and clearing the object mask of untracked objects to output a binary mask configured for moving objects and rectangular bounding box information; whereby said apparatus automatically extracts dynamic moving objects from a sequence of images captured from cameras which do not require static platforms.

2. The apparatus of any of the previous embodiments, wherein said programming for generating the object mask and assigning color attributes to the bounding box performs morphological dilation in the process of creating the bounding box.

3. The apparatus of any of the previous embodiments, wherein said programming for generating the object mask and assigning color attributes to the bounding box detects multiple objects in the bounding box and performs splitting of these multiple objects.

4. The apparatus of any of the previous embodiments, wherein said programming for generating the object mask and assigning color attributes to the bounding box performs a Mahalanobis distance based object reoccurrent verification.

5. The apparatus of any of the previous embodiments, wherein said programming for generating the object mask and assigning color attributes to the bounding box performs T-frame object tracking when removing outliers.

6. The apparatus of any of the previous embodiments, wherein said programming for performing object detection and extraction can be executed whenever a moving object appears in at least three consecutive images of the image sequence.

7. The apparatus of any of the previous embodiments, wherein said programming for said detecting contours is performed in an iterative process which utilizes lower sensitivity thresholds in each subsequent iteration.

8. The apparatus of any of the previous embodiments, wherein said programming for said detecting contours comprises a fast object contour detection filter which executes multiple filters to detect moving object borders in response to receiving a difference image, sub-window value and a sensitivity threshold.

9. The apparatus of any of the previous embodiments, wherein said sensitivity threshold provides a dynamic thresholding operation in response to comparing a first sum of intensity value against a second sum of intensity values added to a sensitivity threshold as an offset.

10. The apparatus of any of the previous embodiments, wherein said apparatus is configured for implementation on mobile devices in real-time.

11. The apparatus of any of the previous embodiments, wherein said apparatus performs object detection and extraction without the need of prior training about objects.

12. An apparatus for performing object detection and extraction from image sequences, comprising: (a) a computer processor; and (b) programming in a non-transitory computer readable medium and executable on said computer processor for performing steps comprising: (i) downsizing images from an image sequence; (ii) buffering at least three sequential images of the image sequence in a circular buffer; (iii) aligning previous image and next image to a current image of said image sequence and outputting a previous difference between the previous image and the current image, and a next difference between the current image and the next image; (iv) determining absolute differences between aligned previous image and aligned current image, and between aligned current image and aligned next image; (v) removing non-overlaps which are redundant non-corresponding sections due to the overlap; (vi) detecting contours on each difference image; (vii) performing an intersection between previous difference and next difference to retain contours of the current image only; (viii) performing gradient tracing to recover any missing object contour information; (ix) morphological dilation in the process of detecting an object bounding box; (x) detecting multiple objects in the bounding box and splitting the multiple objects; (xi) generating an object mask and assigning color attributes to a bounding box; (xii) performing a Mahalanobis distance based object reoccurrent verification; (xiii) performing T-frame object tracking for removing outliers; and (xiv) clearing the object mask of untracked objects to output a binary mask configured for moving objects and rectangular bounding box information; whereby said apparatus automatically extracts dynamic moving objects from a sequence of images captured from cameras which do not require static platforms.

13. The apparatus of any of the previous embodiments, wherein said programming is configured for performing said object detection and extraction whenever the moving object appears in at least three consecutive images of the image sequence.

14. The apparatus of any of the previous embodiments, wherein said programming performs said detecting contours in an iterative process which utilizes lower sensitivity thresholds in each subsequent iteration.

15. The apparatus of any of the previous embodiments, wherein said programming performs said detecting contours utilizing a fast object contour detection filter which executes multiple filters to detect moving object borders in response to receiving a difference image, sub-window value and a sensitivity threshold.

16. The apparatus of any of the previous embodiments, wherein said sensitivity threshold provides a dynamic thresholding operation comparing a first sum of intensity value against a second sum of intensity values added to a sensitivity threshold as an offset.

17. The apparatus of any of the previous embodiments, wherein said apparatus is configured for implementation on mobile devices in real-time.

18. The apparatus of any of the previous embodiments, wherein said apparatus performs object detection and extraction without the need of prior training about objects.

19. A method for performing object detection and extraction from image sequences, comprising: downsizing images from an image sequence; buffering at least three sequential images of the image sequence in a circular buffer of a digital circuit configured for image processing; aligning previous image and next image to a current image of said image sequence and outputting a previous difference between the previous image and the current image, and a next difference between the current image and the next image; determining absolute differences between aligned previous image and aligned current image, and between aligned current image and aligned next image; removing non-overlaps which are redundant non-corresponding sections due to the overlap; detecting contours on each difference image; performing an intersection between previous difference and next difference to retain contours of the current image only; performing gradient tracing to recover any missing object contour information; generating an object mask and assigning color attributes to a bounding box; and eliminating outliers and clearing the object mask of untracked objects to output a binary mask configured for moving objects and rectangular bounding box information; whereby said method automatically extracts dynamic moving objects from a sequence of images captured from cameras which do not require static platforms.

20. The method of any of the previous embodiments, wherein said detecting contours is performed in an iterative process which utilizes lower sensitivity thresholds in each subsequent iteration.

Although the description above contains many details, these should not be construed as limiting the scope of the technology but as merely providing illustrations of some of the presently preferred embodiments of this technology. Therefore, it will be appreciated that the scope of the present technology fully encompasses other embodiments which may become obvious to those skilled in the art, and that the scope of the present technology is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present technology, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for performing object detection and extraction from image sequences, comprising:
   (a) a computer processor; and
   (b) programming in a non-transitory computer readable medium and executable on said computer processor for performing steps comprising:
      (i) downsizing images from an image sequence;
      (ii) buffering at least three sequential images of the image sequence in a circular buffer;
      (iii) aligning a previous image and a next image to a current image of said image sequence and outputting a previous difference between the previous image and the current image, and a next difference between the current image and the next image;
      (iv) determining absolute differences between an aligned previous image and an aligned current image, and between the aligned current image and an aligned next image;
      (v) removing non-overlaps which are redundant non-corresponding sections due to the non-overlap;
      (vi) detecting contours on each difference image;
      (vii) performing an intersection between the previous difference and the next difference to retain contours of the current image only;
      (viii) performing gradient tracing to recover any missing object contour information;
      (ix) generating an object mask and assigning color attributes to a bounding box; and
      (x) eliminating outliers and clearing the object mask of untracked objects to output a binary mask configured for moving objects and rectangular bounding box information;
   whereby said apparatus automatically extracts dynamic moving objects from a sequence of images captured from cameras which do not require static platforms.

2. The apparatus recited in claim 1, wherein said programming for generating the object mask and assigning color attributes to the bounding box performs morphological dilation in the process of creating the bounding box.

3. The apparatus recited in claim 1, wherein said programming for generating the object mask and assigning color attributes to the bounding box detects multiple objects in the bounding box and performs splitting of these multiple objects.

4. The apparatus recited in claim 1, wherein said programming for generating the object mask and assigning color attributes to the bounding box performs a Mahalanobis distance based object reoccurrent verification.

5. The apparatus recited in claim 1, wherein said programming for generating the object mask and assigning color attributes to the bounding box performs T-frame object tracking when removing outliers.

6. The apparatus recited in claim 1, wherein said programming for performing object detection and extraction can be executed whenever a moving object appears in at least three consecutive images of the image sequence.

7. The apparatus recited in claim 1, wherein said programming for said detecting contours is performed in an iterative process which utilizes lower sensitivity thresholds in each subsequent iteration.

8. The apparatus recited in claim 1, wherein said programming for said detecting contours comprises a fast object contour detection filter which executes multiple filters to detect moving object borders in response to receiving a difference image, sub-window value and a sensitivity threshold.

9. The apparatus recited in claim 8, wherein said sensitivity threshold provides a dynamic thresholding operation in response to comparing a first sum of intensity value against a second sum of intensity values added to a sensitivity threshold as an offset.

10. The apparatus recited in claim 1, wherein said apparatus is configured for implementation on mobile devices in real-time.

11. The apparatus recited in claim 1, wherein said apparatus performs object detection and extraction without the need for prior training about objects.

12. An apparatus for performing object detection and extraction from image sequences, comprising:
(a) a computer processor; and
(b) programming in a non-transitory computer readable medium and executable on said computer processor for performing steps comprising:
(i) downsizing images from an image sequence;
(ii) buffering at least three sequential images of the image sequence in a circular buffer;
(iii) aligning a previous image and a next image to a current image of said image sequence and outputting a previous difference between the previous image and the current image, and a next difference between the current image and the next image;
(iv) determining absolute differences between an aligned previous image and an aligned current image, and between the aligned current image and an aligned next image;
(v) removing non-overlaps which are redundant non-corresponding sections due to the overlap;
(vi) detecting contours on each difference image;
(vii) performing an intersection between the previous difference and the next difference to retain contours of the current image only;
(viii) performing gradient tracing to recover any missing object contour information;
(ix) morphologically dilating in the process of detecting an object bounding box;
(x) detecting multiple objects in the bounding box and splitting the multiple objects;
(xi) generating an object mask and assigning color attributes to a bounding box;
(xii) performing a Mahalanobis distance based object reoccurrent verification;
(xiii) performing T-frame object tracking for removing outliers; and
(xiv) clearing the object mask of untracked objects to output a binary mask configured for moving objects and rectangular bounding box information;
whereby said apparatus automatically extracts dynamic moving objects from a sequence of images captured from cameras which do not require static platforms.

13. The apparatus recited in claim 12, wherein said programming is configured for performing said object detection and extraction whenever the moving object appears in at least three consecutive images of the image sequence.

14. The apparatus recited in claim 12, wherein said programming performs said detecting contours in an iterative process which utilizes lower sensitivity thresholds in each subsequent iteration.

15. The apparatus recited in claim 12, wherein said programming performs said detecting contours utilizing a fast object contour detection filter which executes multiple filters to detect moving object borders in response to receiving a difference image, sub-window value and a sensitivity threshold.

16. The apparatus recited in claim 15, wherein said sensitivity threshold provides a dynamic thresholding operation comparing a first sum of intensity value against a second sum of intensity values added to a sensitivity threshold as an offset.

17. The apparatus recited in claim 12, wherein said apparatus is configured for implementation on mobile devices in real-time.

18. The apparatus recited in claim 12, wherein said apparatus performs object detection and extraction without the need for prior training about objects.

19. A method for performing object detection and extraction from image sequences, comprising:
downsizing images from an image sequence;
buffering at least three sequential images of the image sequence in a circular buffer of a digital circuit configured for image processing;
aligning a previous image and a next image to a current image of said image sequence and outputting a previous difference between the previous image and the current image, and a next difference between the current image and the next image;
determining absolute differences between an aligned previous image and an aligned current image, and the between aligned current image and an aligned next image;
removing non-overlaps which are redundant non-corresponding sections due to the overlap;
detecting contours on each difference image;
performing an intersection between the previous difference and the next difference to retain contours of the current image only;
performing gradient tracing to recover any missing object contour information;
generating an object mask and assigning color attributes to a bounding box; and
eliminating outliers and clearing the object mask of untracked objects to output a binary mask configured for moving objects and rectangular bounding box information;
whereby said method automatically extracts dynamic moving objects from a sequence of images captured from cameras which do not require static platforms.

20. The method recited in claim 19, wherein said detecting contours is performed in an iterative process which utilizes lower sensitivity thresholds in each subsequent iteration.

* * * * *